United States Patent

Lefton

[11] Patent Number: 5,927,676
[45] Date of Patent: Jul. 27, 1999

[54] EMERGENCY ROADSIDE REFLECTORS

[76] Inventor: Sheldon Lefton, 3403 Lake Garda Dr., San Jose, Calif. 95135

[21] Appl. No.: 08/984,974

[22] Filed: Dec. 4, 1997

[51] Int. Cl.$^6$ ....................................................... B60R 1/02
[52] U.S. Cl. .............................. 248/472; 248/456; 40/606
[58] Field of Search ................................ 248/472, 442.2, 248/444, 455, 456, 439; 40/606, 610, 612, 746, 756

[56] References Cited

U.S. PATENT DOCUMENTS

| | | | |
|---|---|---|---|
| 3,343,778 | 9/1967 | Levine | 248/472 |
| 3,596,627 | 8/1971 | Monk | 116/63 P |
| 3,970,033 | 7/1976 | Lindner et al. | 116/63 P |
| 4,081,119 | 3/1978 | Messmore | 40/610 |
| 4,134,643 | 1/1979 | Lee | 350/97 |
| 4,467,727 | 8/1984 | Strommer | 248/456 |
| 5,582,382 | 12/1996 | Pan-Yang | 248/456 |
| 5,746,410 | 5/1998 | Hung | 248/456 |

*Primary Examiner*—Leslie A. Braun
*Assistant Examiner*—Willie Berry, Jr.
*Attorney, Agent, or Firm*—Patent & Trademark Services; Thomas Zack; Joseph H. McGlynn

[57] ABSTRACT

A foldable light reflector apparatus having a panel with a reflecting surface and a pivotally support base frame support. In one embodiment the reflecting surface resembles an arrow pointing a motorist in one direction. End frame members engage holes in the panel's perimeter flange to support the panel in an upright position. By selecting engaging the end frame members with different flange holes and turning the panel upside down, the direction the reflecting arrow points can be reversed. To collapse the two part frame into the panel and its surrounding flange, only the frame member with its end in the bottom flange hole need be disengaged as the other two frame ends pivot in their respective side holed mounts.

3 Claims, 2 Drawing Sheets

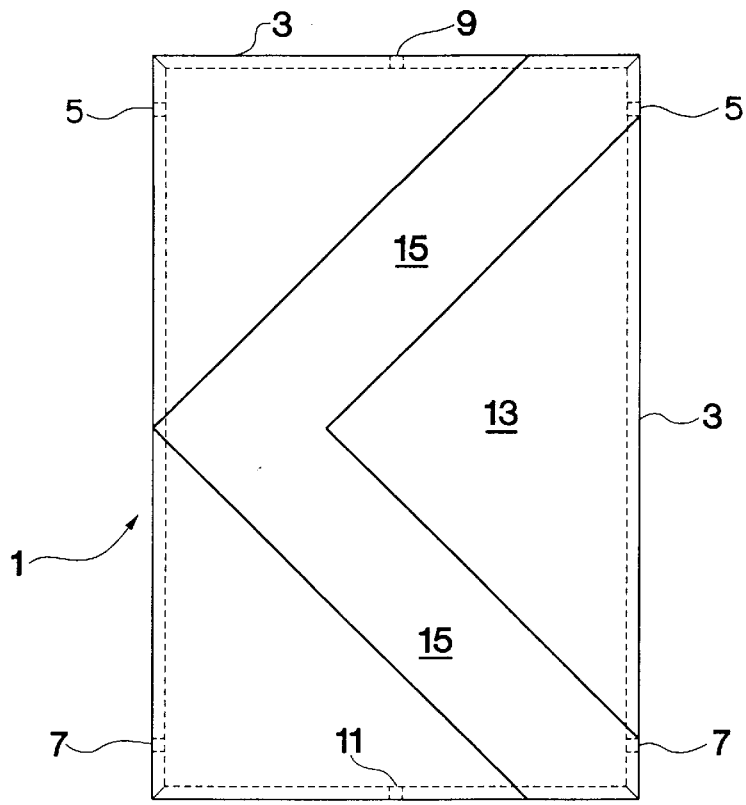
FIG. 1
FIG. 2
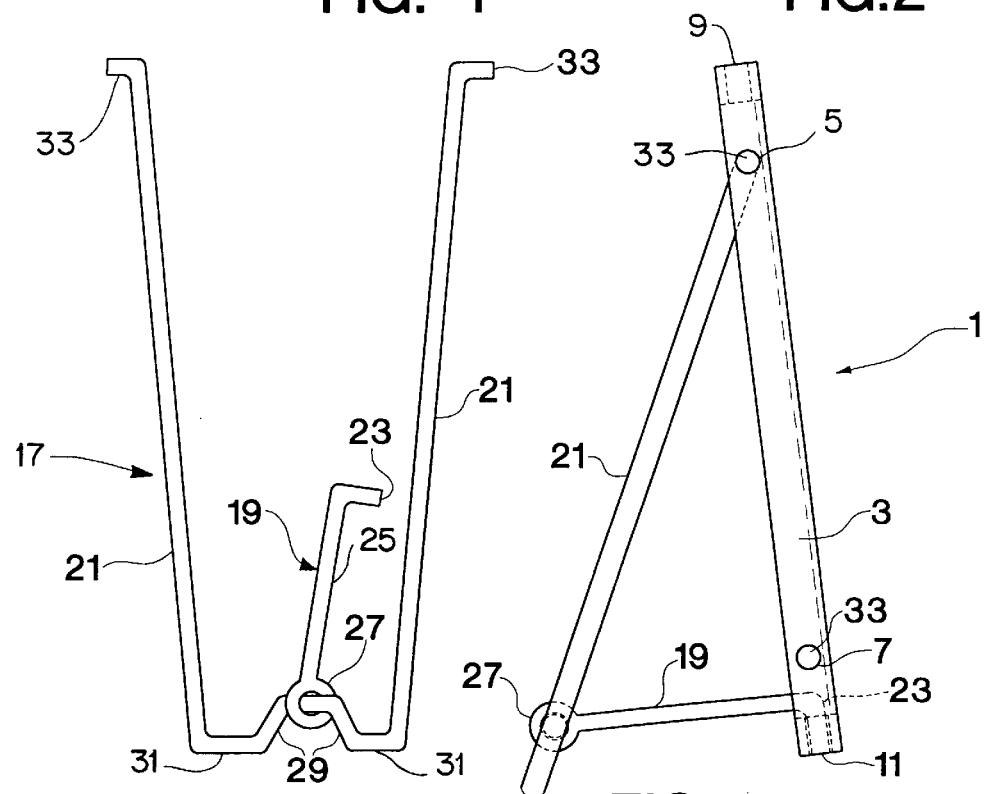
FIG. 3
FIG. 4

EMERGENCY ROADSIDE REFLECTORS

BACKGROUND OF THE INVENTION

Portable displays which include reflective surfaces that can be set up by motorists are known. With many such displays there is a base stand or supporting frame and a display panel with a reflective surface mounted on the base stand. Some of these displays are foldable to permit their easy storage within the confines of the carrying vehicle. With such portable displays, the base and the display are usually joined by a pivot or swivel connection to permit the folding of the display with respect to the base. The present invention related to one such foldable display with a reflective surface having a base support frame and a panel member pivotally joined to the frame all as more fully described herein.

DESCRIPTION OF THE PRIOR ART

Foldable compact visual displays with reflective surfaces usable by motorists are known. For example, in U.S. Pat. No. 3,343,778 to Levine the emergency warning reflector disclosed is mounted on a foldable pair of U-shaped wire legs to permit the unit to collapse.

In the Monk patent (U.S. Pat. No. 3,596,627) the supporting base is a heavy steel rod formed into a polygon with a pivotally secured plate with reflectors.

The Lindner et al reference (U.S. Pat. No. 3,970,033) uses a closed loop having elongated side walls with a cross section that is generally H-shaped. A pair of plates with a perimeter groove nest in a different lateral opposed side face defined by the loop.

And in the Lee reference (U.S. Pat. No. 4,134,643) the reflecting member is mounted on a panel held vertically on a supporting base having hinged wires that are spring loaded to bear against the panel and keep it in a central and upright position. The present invention relates to a foldable reflector apparatus having a panel member with a reflective surface and a pivotally mounted support frame base wherein by disengaging one of the frame contacts the frame may be folded into the panel all as more fully set forth in this specification.

SUMMARY OF THE INVENTION

This invention relates to a foldable reflector apparatus having a panel with a reflecting surface and a pivotally support base frame support. By selectively disengaging one of the frame connections, the frame may be folded into the panel for storage or transport.

It is the primary object of the present invention to provide for an improved foldable reflector apparatus.

Another object is to provide for such an apparatus wherein the panel with its reflector can store the supporting frame and also be reversed to indicate a different warning to a passing motorist.

These and other objects and advantages of the present invention will become apparent to readers from a consideration of the ensuing description and the accompanying drawings.

BRIEF DESCRIPTION OF THE DRAWINGS

FIG. 1 is a front view of the panel used in the invention's preferred embodiment FIG. 2 is a side view of the panel used in the FIG. 1 embodiment.

FIG. 3 shows a back view of the supporting frame base for the panel.

FIG. 4 shows a side view of the supporting frame base joined to the panel.

DESCRIPTION OF THE PREFERRED EMBODIMENT

Figure 5:
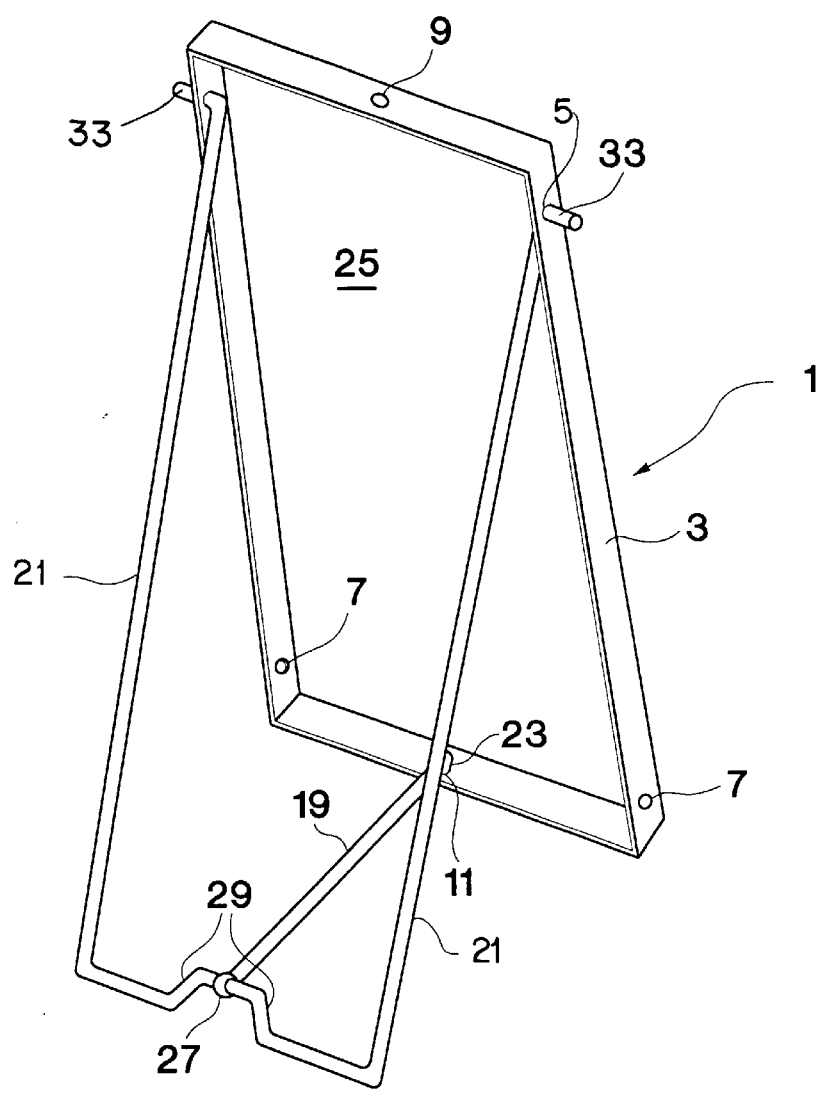
FIG. 5 is a perspective rear view of the assembled supporting frame base and panel.

FIG. 1 is a front view of the molded plastic rectangular panel 1 used in the invention's preferred embodiment. In one embodiment this plastic panel was about 14 inches high by 9 inches in width and made of a ABS (Acrylonitrile-butadiene-styrene) high impact resistant plastic material using the plastic injection molding process for its manufacturer. A rear extending flange 3, indicated by dotted lines, is approximately perpendicular to the planar flat face of the panel 1 on its two sides, the top and the bottom. The two opposite side flanges 3 each have two spaced hole pairs 5 and 7 there through. The upper pair of side flange holes 5 are horizontally aligned and, in the mentioned embodiment with the 14 inch side height, were one inch from the panel top.

The second lower pair of flange holes 7 are also horizontally aligned and, in the same mentioned embodiment, were one inch up from the panel bottom. Both the top and bottom flanges have holes through them at approximately their respective mid lengths as indicated by the numbers 9 and 11, respectively. In this same panel embodiment the panel's exposed front surface area 13 was colored with a white reflective background such the while color referred to as "Scotchlite White"™ reflecting sheeting.

The two joined diagonal areas 15 forming the shape of an arrow to the left were made of a different light reflective surface material such as "Scotchlite Red"™ reflecting sheeting. With this construction light from an oncoming light source, such as the headlights of a vehicle, would reflect from the white and red reflecting surfaces and warn the driver to turn to the left to avoid an obstruction, such as a stalled vehicle, down the road further in their direction of travel. Other light reflecting warning signs and designs could also be used on the panel's front facing surface as desired.

FIG. 2 is a side view of the panel used in the FIG. 1 embodiment. The front panel 1 face is to the right with the panel's thickness being indicated by the vertical dotted line. The upper 5 and lower 7 side drill holes in the panel's side flange 3 as well at the top flange drill hole 9 and the bottom and the bottom mid length hole 11 are shown in dotted line format in this view. In the mentioned specific embodiment, the holes 5, 7, 9, and 11 were each drilled 3/16 of an inch in diameter through the flange 3 which was 3/4 of an inch extended back from the panel's front flat planar.

FIG. 3 shows a back view of the supporting frame base 17 for the panel. This metallic rigid base is made up of two separate pivotally connected rigid members 19 and 21. The shorter of the two members 19 has a free end near its right angled leg segment 23 with respect to the longer leg segment 25.

At the other end of segment 25 is a closed loop end 27 which encircles the midsection and horizontal portion of angled segment 29 of member 21. This encircling interconnection of base members 19 and 21 permits the easy pivotal motion of member 19 with respect to member 21.

Along the lower portion of member 21 are two ground engaging horizontal segments 31 located on opposite sides of the angled midsection segment 29. The longest straight leg lengths of each member 21 extend from their ground engaging horizontal members 31 and terminate at joined right angled free end segments 33. These free end segments 33 have a cross sectional diameter slightly smaller than the diameter of the flange holes into which they can be inserted.

FIG. 4 shows a side view of the supporting frame base for the panel as joined to the panel 1. The side panel flange 3 is visible including the upper(5) and lower (7) side through holes. Both of the panel's top through hole 9 and lower through hole 11 are shown in dotted line format. Engaging the upper hole 5 are the two leg 21 ends 33 only one of which is shown. At the lower frame the frame member 19 has been rotated on its swivel connection at frame segment 27 to assume a substantially horizontal position with its right angled end 23 inserted into and engaging the lower center flange hole 11.

The center angled portion 29 of frame member 21 appears as straight in this view. No frame member in this figure engages the lower flange holes 7. In the FIG. 4 view with the arrow reflective surface pointing to the left, not all of the six flanges holes are engaged by frame ends only the three engaged holes shown. Should it be desired to change the orientation of the panel's reflective arrow depicted by the joined reflective surfaces 15 (see FIG. 1) to point right, the user need simply disengage the frame ends, turn panel 1 up side down and then reinsert the frame ends such that the leg frame members ends 33 engage now upper holes 7 while the frame end 23 engages now lower hole 9.

Clearly, any design placed on the panel's front face may be reversed in direction using this type procedure of disengagement of initially supporting frame ends, turning the panel upside down and then reinserting the frame ends into different supporting flange holes. For example, if a word or symbol conveys a different meaning when reversed on the panel's displayed facing side this word or symbol can be used as desired.

FIG. 5 is a perspective rear view of the assembled supporting frame base and panel. This view, like FIG. 4, shows assembled panel 1 supported by the two engaged base frame members 19 and 21. The flat planar rear portion 25 of panel 1 is visible in this figure with the extending flange 3 extending around its perimeter on all four sides. As previously stated in this set up, only three of the six flange holes are engaged by the inserted bent three frame ends 23 (one) and 33 (two ends).

Figure 6:
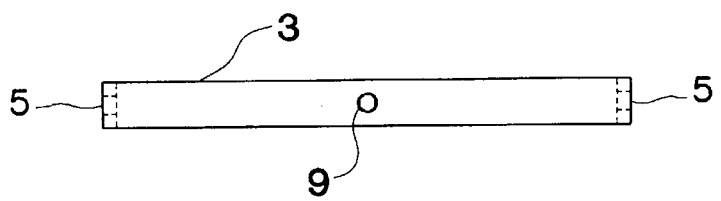
FIG. 6 depicts a top view of the panel.

FIG. 6 depicts a top view of panel 1 with its top flange 3 having the center through hole 9 and the two side holes 5 shown by the dotted lines. A bottom view of the panel 1 would indicate a similar view for the bottom center hole 11 and the two lower side flange holes 7.

To fold the supporting frame into the extending flange 3, the user need only disengage the center leg member 19 end 23 from the flange's center hole 9 or 11, as the case may be, and pivot the leg 19 and the two long legs of frame members 21 to collapse the frame into the box-like flange holder. The two inserted leg ends 33 need not be taken out of their side flange holes only pivoted therein in this collapsing process. By allowing the ends 33 to remain in the panel side flange holes during packaging, transport or storage, the user is assured the frame members will not be separated from the panel.

Alternately, should for some reason the user desire to remove the frame ends 33 from their inserted holes, the frame ends may all be pulled out from their side/top/bottom holes and the frame stored entirely within the flange's perimeter.

The plastic panel 1 with its side extending plastic flanges 3 may be constructed as a unitary structure according to the plastic injection molding process. Injection molding is a plastic molding process whereby heat softened plastic material is forced under very high pressure into a metal cavity mold, usually aluminum or steel, which is relatively cool. The inside cavity of the mold is comprised of two or more halves, and is the same desired shape as the product to be formed (in this case the panel with its flanges).

High pressure hydraulics are used to keep the mold components together during the actual injection phase of the molding process. The injected plastic is allowed to cool and harden in the mold. The hydraulics holding the multiple component mold cavity together are released, the mold halves are separated and the solid formed plastic item is removed. Injection molding can be highly automated process and is capable of producing extremely detailed parts at a very cost effective price. The process should be invaluable in producing this invention's panel and flanges cost effectively.

Normally the relatively heavy metal frame members 19 and 21 have sufficient weight to keep the upright lighter panel 1 in place as vehicles pass and create air turbulence. Should it be found that strong winds or other conditions cause the supported upright panel to be unstable, a user may place a car jack, wheel lug wrench or jack handle, or other available heavy object across the lower panel flange to increase its upright stability.

Although the present invention's preferred embodiment and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A foldable reflector apparatus comprising:

a panel member having a facing front, two opposite sides, a top and a bottom, said facing front having a background reflecting material surface of a first color and a second reflecting material surface of a second color different from the first color, said panel's second reflecting material surface forming an arrow shaped design pointing in one direction with respect to one of the panel's two sides, said formed arrow direction being reversible in the direction of pointing by mounting the panel upside down;

said panel member having flange sides extending rearwardly from the facing side and substantially around the panel's two sides, top and bottom, said flange sides having a plurality of spaced flange holes located in the panel's sides, top and bottom flanges;

a support base frame having two pivotally joined members, each of said pivotally joined members having at least one free end whereby the frame members free ends may be inserted into the flange holes to support the panel in an upright position whereby said foldable reflector may be reversed by repositioning said two pivotally joined members.

2. The apparatus as claimed in claim 1, wherein the panel has a rectangular perimeter flange configuration with two separated side holes in each of the panel's two side, side flange members, one of said flange side holes being located in the flange's top member and another flange side hole being located in the flange's bottom member.

3. The apparatus as claimed in claim 2, wherein said two pivotally joined frame members are joined together near the center portions of each of the members and have at least one bent segment located near the member's free end.

* * * * *